(No Model.) 2 Sheets—Sheet 1.
E. J. WOOD.
DYNAMOMETER.
No. 468,947. Patented Feb. 16, 1892.
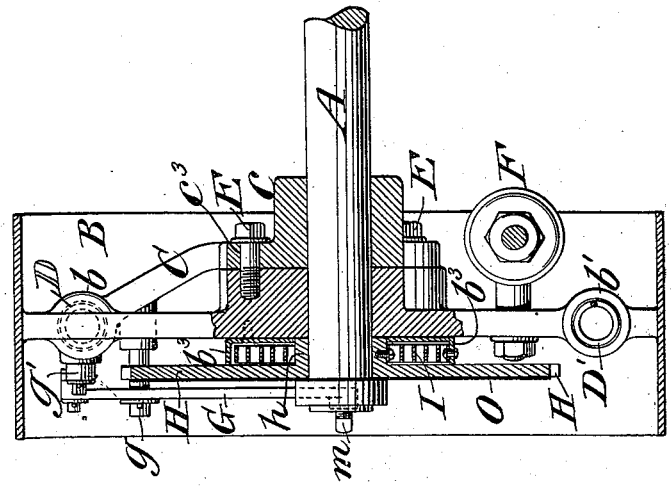
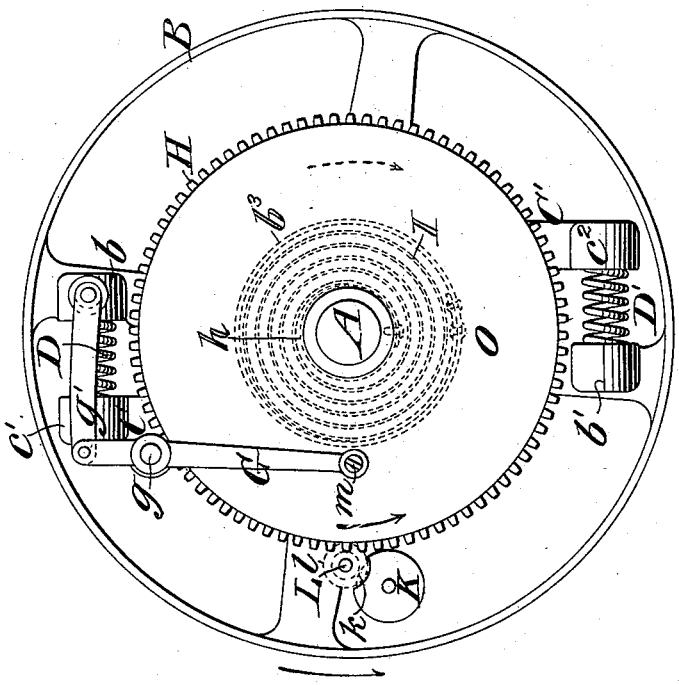
Witnesses:
O. Lundgren
George Barry.
Inventor:
Edgar J. Wood
by attorneys
Brown & Ward (No Model.) 2 Sheets—Sheet 2.
E. J. WOOD.
DYNAMOMETER.
No. 468,947. Patented Feb. 16, 1892.
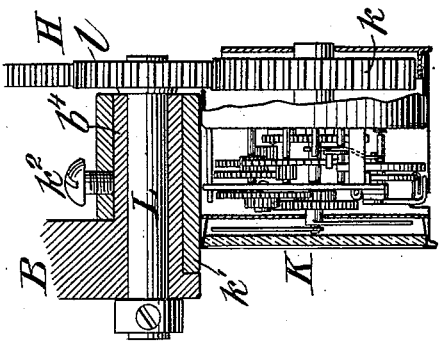
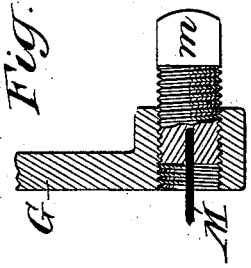
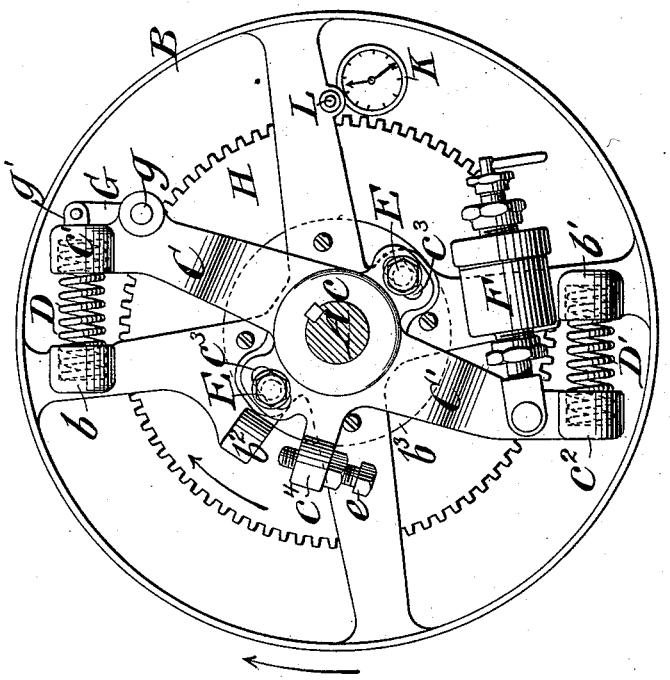
Witnesses:
C. L. Sundgren
George Barry.
Inventor:
Edgar J. Wood
by attorneys
Brown & Seward

UNITED STATES PATENT OFFICE.

EDGAR J. WOOD, OF BROOKLYN, NEW YORK.

DYNAMOMETER.

SPECIFICATION forming part of Letters Patent No. 468,947, dated February 16, 1892.

Application filed November 27, 1891. Serial No. 413,173. (No model.)

*To all whom it may concern:*

Be it known that I, EDGAR J. WOOD, of Brooklyn, in the county of Kings and State of New York, have invented a new and useful Improvement in Dynamometers, of which the following is a specification.

My invention relates to an improvement in dynamometers for use in connection with a power-driven shaft to disclose the number of units of power—horse-power, for example—which may have been used from the shaft during a predetermined length of time.

A practical embodiment of my invention is represented in the accompanying drawings, in which—

Figure 1 is a view of the dynamometer in front elevation. Fig. 2 is a transverse central section of the same. Fig. 3 is a rear view. Fig. 4 is an enlarged view in detail of the clock-work and its connection with the record receiving and indicating disk, and Fig. 5 is an enlarged view in detail of the tracing-pencil and its holder.

A represents a driven shaft from which power is to be supplied to run a machine or for any purpose required. A pulley B, mounted on the shaft A, serves to transmit motion to the shaft from a source of power not shown. The pulley B is loosely mounted on the shaft, and is connected with the shaft as follows: A lever, the arms C and C' of which extend, preferably, in opposite directions from the hub $c$, is keyed to the shaft, so as to cause the shaft to rotate therewith, and the arms C and C' are each provided with a socket for the reception of an end of spiral spring. The socket on the arm C is denoted by $c'$, and that on the arm C' by $c^2$. The spiral springs are denoted by D and D', respectively, and their opposite ends are seated in sockets $b$ and $b'$, fixed to the pulley B. The rotation of the pulley B in the direction to drive the shaft A forward will tend to compress the springs D and D', and the greater the load placed upon the shaft A the greater will be the amount which the springs will be compressed. Screws E, extending through elongated slots $c^3$ in the hub of the lever and into the hub of the pulley B, serve to hold the lever and the pulley in the proper proximity to each other on the shaft A. A set-screw $e$, extending through a screw-threaded perforation in a projection $c^4$ on the hub of the lever, serves as a stop to limit the abnormal separation of the sockets $b$ and $c'$, when the pulley is suddenly stopped or retarded by engagement with an offset $b^2$ on the pulley B. A dash-pot F of any well-known or approved form is fixed to the pulley B, and a piston working therein is connected with an arm C' of the lever to prevent sudden movements of the lever. A traverse-arm G is pivotally secured to one of the arms C, for example, of the lever, its free end extending over the face of a spur-wheel H, loosely mounted on the shaft A and connected with the pulley B by means of an actuating-spring I. One end of the spring I is secured to the hub $h$ of the wheel H, and its opposite end is secured to a housing $b^3$, fixed to the pulley B. The rotary movement of the pulley B is in the direction to wind the spring I, while the tension of the spring is exerted in the direction to rotate the wheel H independently of the shaft A and pulley B in the same direction as that in which the pulley rotates. The result is that while the wheel H is carried around with the pulley B the independent rotary movement of the said wheel may be utilized to actuate the clock-work.

A system of clock-work K, of any well-known or approved construction, and provided with a dial and hands to indicate the time, is secured to the pulley B at or near the margin of the wheel H, so that the motion of the wheel H may be transmitted to its actuating spur-wheel $k$. The connection of the clock-work with the pulley is accomplished in the present instance as follows: The pulley B has projecting from one of its spokes a stud $b^4$, which receives thereon a sleeve $k'$, fixed to the casing of the clock-work, and a set-screw $k^2$ serves to lock the sleeve to the stud. A stub-axle L is mounted within the stud $b^4$ and carries on its ends a pinion $l$, adapted to intermesh with the wheel H and the clock-actuating wheel $k$. It follows, therefore, that as the clock is carried around bodily by the pulley B its works will be actuated by the tension of the spring I, exerted through the wheel H, pinion $l$, and wheel $k$. The clock-work, including an escapement, as is common, is so related to the wheel H that the latter will complete a revolution independently of the pulley B and shaft A within a certain predetermined time, in the present instance in twelve hours.

The traverse G, hereinbefore referred to, pivotally secured to the arm C of the lever, as at $g$, carries at its free end a pencil or marker M, with point toward the face of the wheel H. The opposite end of the said arm G is connected with the pulley B by a link $g'$. The pencil or marker M is secured in a holder $m$, having a screw-threaded engagement with a socket in the arm G to adjust the point of the pencil or marker toward and away from the face of the wheel H.

A thin disk O, of paper or other suitable material to receive a mark or impression from the pencil or marker M, is secured to the front of the wheel H, between it and the pencil. In practice I prefer to make the disk O removable, so that it may be replaced at desired intervals—each day, for example—by another.

The operation may be briefly stated as follows: As the springs D D' are more or less compressed under the load placed upon the shaft A, the end of the traverse-arm G, carrying the pencil or marker, will be moved by the arm C of the lever nearer to or farther away from the center of the disk O, and as the disk O is at the same time caused to rotate independently of the pulley B and shaft A, the pencil or marker will trace on the disk a line which will indicate the heavier or lighter load on the shaft A. Having previously determined the number of horse-power required to move the marker into the various positions within the limits of its movement, and knowing the time required to make any lengths of arc, the number of horse-power used from the shaft A during the predetermined time may be readily ascertained.

The disk O may be either provided with a chart, so that the horse-power may be read directly therefrom, or it may be blank and referred to a standard chart in the hands of the vendor of the power and the number of horse-power used there determined.

What I claim is—

1. In combination, a load-carrying shaft, a record-receiving disk free to rotate independently of the load-carrying shaft, an arm fixed to rotate with the shaft, a movable part having a yielding connection with the said arm and thereby with the shaft and serving to transmit power from a source of power to the shaft, a traverse-arm under the control of the said movable part and carrying a marker, and means for rotating the record-receiving disk independently of the load-carrying shaft and its actuating power, substantially as set forth.

2. The combination, with a load-carrying shaft and an arm fixed to rotate with the shaft, of a power-transmitting pulley loosely mounted on the shaft and having a yielding connection with the said arm to drive the shaft, a spur-wheel loosely mounted on the shaft, a spring connecting the spur-wheel with the power-transmitting pulley, a record-receiving disk carried by the spur-wheel, a traverse-arm under the control of the power-transmitting pulley and carrying a marker, and clock-works carried by the said power-transmitting pulley and actuated by the spring connected with the disk-carrying spur-wheel, substantially as set forth.

3. In a dynamometer, a rotary part, a record-receiving disk and a clock, both carried by a rotary part, a spring for actuating the disk independent of the rotary part, a connection between said spring and the clock for actuating the clock and controlling the movement of the disk, and a traverse-arm carrying a marker and under the control of the said rotary part, substantially as set forth.

4. The combination, with the load-carrying shaft and arms radiating therefrom and fixed to rotate with the shaft, of a power-transmitting pulley loosely mounted on the said shaft, springs connecting the pulley with the said arms, a spur-wheel loosely mounted on the shaft and adapted to control the rotary movement of a record-receiving disk, a spring connecting the spur-wheel with the power-transmitting pulley, a clock geared with the said spur-wheel and actuated by a spring which connects the spur-wheel with the pulley and in turn controlling the movement of the spur-wheel, and the traverse-arm controlled by the pulley and carrying a marker in position to engage a record-receiving disk when the latter is adjusted for operation, substantially as set forth.

5. The combination, with the load-carrying shaft, the arms radiating therefrom and fixed to rotate therewith, and the power-transmitting pulley loosely mounted on the shaft and yieldingly connected with the arms, of an adjustable stop to limit the movement of the pulley relative to the arms and the dash-pot for steadying the movement of the pulley relative to the arms, substantially as set forth.

6. The combination, with the power-transmitting pulley, of a clock fixed to the pulley to be carried bodily around by the pulley and the clock-actuating spring fixed at one end of the pulley and adapted to be carried bodily around by the pulley and at the same time actuate the clock independent of the pulley, substantially as set forth.

EDGAR J. WOOD.

Witnesses:
FREDK. HAYNES,
GEORGE BARRY.